(12) United States Patent
Krieger

(10) Patent No.: US 7,054,474 B1
(45) Date of Patent: May 30, 2006

(54) IMAGE NOISE REDUCTION

(75) Inventor: Donald N. Krieger, Pittsburgh, PA (US)

(73) Assignee: 3D Sharp, Inc., Pittsburgh, PA (US)

( * ) Notice: Subject to any disclaimer, the term of this patent is extended or adjusted under 35 U.S.C. 154(b) by 762 days.

(21) Appl. No.: 10/206,031

(22) Filed: Jul. 25, 2002

Related U.S. Application Data

(60) Provisional application No. 60/307,799, filed on Jul. 25, 2001.

(51) Int. Cl.
*G06K 9/00* (2006.01)

(52) U.S. Cl. .................. 382/128; 382/275; 348/241

(58) Field of Classification Search ........ 382/128–133, 382/169, 172, 194, 210, 234–237, 248, 255, 382/260, 264, 275, 294, 299, 305; 358/1.9; 378/108, 207; 356/614; 600/443; 348/241; 380/217, 208
See application file for complete search history.

(56) References Cited

U.S. PATENT DOCUMENTS

| | | | | |
|---|---|---|---|---|
| 5,533,149 A | * | 7/1996 | Kaplan et al. | 382/260 |
| 5,594,816 A | * | 1/1997 | Kaplan et al. | 382/275 |
| 5,949,811 A | * | 9/1999 | Baba et al. | 378/108 |
| 6,178,271 B1 | * | 1/2001 | Maas, III | 382/294 |
| 6,226,415 B1 | * | 5/2001 | Wilson et al. | 382/275 |
| 6,579,238 B1 | * | 6/2003 | Simopoulos et al. | 600/443 |
| 6,728,003 B1 | * | 4/2004 | Gallagher et al. | 358/1.9 |
| 6,854,885 B1 | * | 2/2005 | Wischmann et al. | 378/207 |
| 6,873,422 B1 | * | 3/2005 | Nahum et al. | 356/614 |

* cited by examiner

*Primary Examiner*—Bhavesh M. Mehta
*Assistant Examiner*—Seyed Azarian

(57) ABSTRACT

A method and an apparatus are disclosed by which both random and systematic noise may be reduced in electronic images.

33 Claims, 8 Drawing Sheets

IMAGE NOISE REDUCTION

IMAGE NOISE REDUCTION

This application is claim benefit of Application No. 60/307,799 filed on Jul. 25, 2001, entitled "IMAGE NOISE REDUCTION".

FIELD OF INVENTION

The present invention relates in general to image noise reduction[39] in digital image[17] processing and in particular, to methods of noise[37] reduction of particular use for images with systematic noise[41] and/or random noise [42]. Noise is found in numerous medical imaging modalities, particularly fluoroscopy and ultrasound. A notable field for application to non-medical images is to images seen through night vision devices.

BACKGROUND OF THE INVENTION

Prior Art

There are numerous publications and patents regarding information compression which lay out methods by which functions[23] which effectively model the signal and which ineffectively model the noise[37] are used to encode (fit the function[25]) the signal and then later decode (expand the function [27]) it. No mention has been found, however, regards using this as a means to remove noise from images or, in particular, to remove noise from medical images[2].

Utilizing the most recently acquired image and one or more previously acquired images for $$\frac{signal}{noise}$$

[38] enhancement has been described using frame averaging. This is particularly to be found in medical ultrasound[6] applications. No mention has been found that this frame averaging is a special case of a more general formulation which would provide much more powerful signal enhancement.

Frame averaging is typically performed for the individual pixels in the reduced noise image[39]. The noise reduction is approximately $\sqrt{N}$ where N is the number of images in the average, i.e. the number of pixels used for each averaged pixel in the reduced noise image. Noise reduction in this context is expressed as the ratio of the noise values of the original and noise reduced image. Since N is typically 2, the noise reduction produced by frame averaging is typically $\sqrt{2} \cong 1.414$. Note that the function which is used is one-dimensional.

The information compression literature and methods typically involve one or two-dimensional functions, e.g. the discrete cosine transform, and typically utilize 64 points at a time or less. The claimed method utilizes functions with one or more dimensions. In so doing the number of points included in each fit is potentially much higher than that typically used for either frame averaging or image compression. Monte Carlo simulations of the claimed method have shown that the resultant noise reduction is correspondingly increased to approximately $$\frac{\sqrt{N - df - 1}}{2}$$

where N is the number of pixels in a pixel block[14], i.e. the number of pixels used for each fit, and df is the number of parameters[24] in the function.

In one test, N, the number of pixels in the pixel block was 512 (16×16×2) and df was 72 (6×6×2), producing estimated noise reduction of approximately $$\frac{\sqrt{512 - 73}}{2} = \frac{\sqrt{439}}{2} \cong \sqrt{110} \cong 10.5.$$

In another test 4-parameter basis functions were used along each of the 3 axes, for a total of 64 parameters, and 10 observations along each axis, for a total of 1000. The measured noise reduction achieved in that test was approximately 20. This is more than ½ of the theoretical ideal enhancement achievable with averaging, namely $\sqrt{1000-64-1} \cong 30.5$.

Note that each image is a 2-dimensional object and that a sequence of images forms a 3-dimensional object. Thus the "curve"fitting and subsequent function expansion may be carried out in 1, 2, or 3 dimensions, readily providing the contribution of an enormous number of observations to the estimation of each parameter with greater noise reduction than was previously achievable.

Specific considerations for use in fluoroscopy[5] during medical procedures[7]: There is a wide variety of clinical procedures which require acquisition of numerous lengthy fluoroscope image sequences. For example, neuroradiologic intervention is a common treatment of vascular lesions and neoplasms of the head and neck which requires extensive use of fluoroscopy, i.e. serial X-ray imaging. Typical fluoroscopy times are on the order of 60 minutes [Kuwayama et. al., 1994]. At a full 30 frames per second, 60 minutes of fluoroscopy represents 108,000 X-ray images, a very significant dosage to the patient. Even for the practitioner, scattered X-rays from one hour of fluoroscopy produce as much as ⅕ the acceptable whole body yearly dose [Giblin et. al., 1996].

This exposure can be reduced by 75% or more by pulsed fluoroscopy, i.e. reduced frame rate imaging [Bushong, 1994]. Even with 90% reduction, the equivalent 10,800 X-ray images represents considerable exposure, not only for the patient, but for radiologic personnel who perform such procedures 100's of times each year.

Reflective of these large X-ray dosages, fluoroscopy during endo-vascular procedures of the head and neck carry significant risks, e.g. skin reactions [Huda, 1994, Carstens et. al., 1996]. This coupled with progressively diminishing acceptable exposure values [Bushong, 1994] has led to considerable and persistent interest in studying X-ray exposure during neurovascular interventions [Chopp et. al., 1980, Plunkett et. al., 1986', Berthelson et. al., 1991, Hughes et. al., 1994], [Marshall, Faulkner, 1995, Bergeron et. al., 1994]. A variety of strategies have been devised to minimize X-ray exposure both for the patient and radiologic personnel including proper room design and body shielding [Bales, Greening, 1991], use of filters to protect the eyes [Chakeres, Wiatrowski, 1984] and to reduce over-all X-ray exposure

[Katsuda et. al., 1996], sophisticated collimation techniques [Rudin et. al., 1996], the above mentioned pulsed fluoroscopy [Bushong, 1994] to reduce the number of images per second, and the ongoing development of more sensitive cameras which enables high resolution images with reduced X-ray flux. Note that reduced X-ray flux means reduced X-ray intensity means reduced numbers of X-ray photons.

The need is to reduce X-ray dose to patient and radiologic personnel during fluoroscopic procedures while maintaining acceptable quality images. The claimed method and apparatus are unique and powerful. They enable generation of acceptable quality images with a fraction of the X-ray intensity which would otherwise be required. Reducing the X-ray intensity correspondingly reduces the X-ray dose to which both patient and radiologic personnel are exposed, irregardless of other dose reduction techniques which are in use.

The technical problem which must be solved arises because reduced X-ray flux produces increased random noise[42] in the image [Reichman, Astrand, 1979] as well as image darkening and reduced contrast, i.e. the X-ray intensity, the number of X-ray photons/image, is positively correlated with the $$\frac{signal}{noise}$$

(Reichman, Astrand, 1979). This gives rise to conflicting requirements: maximizing the X-ray intensity improves the $$\frac{signal}{noise},$$

yet it also maximizes the X-ray dosage to which the patient and radiologic personnel are exposed.

To summarize the background the proposed method and apparatus enable considerably greater noise reduction in images than had previously been available. It is highly effective at attenuating random noise, which is a major contaminant of X-ray images acquired with low doseage. Because the claimed method can attenuate random and other types of noise, it is effective at recovering image quality when contaminated due to reduced doseage. Even though there are a wide variety of techniques already in place to reduce X-ray doseage during medical procedures which utilize fluoroscopy, there continues to be a significant risk of overexposure leading to morbidity for both the patient and the medical personnel. The claimed method and apparatus provide a means by which the doseage can be routinely reduced by a factor of 3 or more, dramatically reducing the risks.

SUMMARY OF THE INVENTION

The apparatus receives images in analogue or digital form. If received in analogue form, they are digitized. The data are treated as sets of pixels whose coordinates[13] are typically along the horizontal and vertical axes of the image and along the axis from one image to the next (time). For a single data frame, the time coordinate can be constant or can vary over the frame indicating the exact moment at which each point was collected. This enables capture of time skew due to finite data digitization rates. The axes in the plane of the image may be as described or otherwise if convenient.

Sequences of images are divided into pixel blocks. Least squares regression is used to fit a function to each block whose dimension is equal to the number of distinct axes on which the pixel coordinates in the block lie. For example, if pixels from a raster line in a single image form a pixel block, the function need only be 1-dimensional. If pixels from a square region of each of 4 images form a pixel block, the function would be 1, 2 or 3-dimensional.

Once the fit[25] is obtained, the fit function is expanded [27] to "realize" selected points in or near [32] the pixel block for display or further manipulation. The coordinates of the realized points need not be the same as any of the coordinates of the original data points, avoiding any additional calculation for "resampling."

If the realized points are outside the corresponding data blocks along the positive time axis, the resulting points constitute a prediction. For this reason, the component of the fit function along the time axis must be chosen carefully for stability if this capability is to be used. The components along the other axes are selected to (a) capture the true data, (b) capture expected systematic noise, and (c) reduce random noise. The realized points attenuate information in the function terms corresponding to identified noise[40].

ADVANTAGEOUS EFFECTS OF THE INVENTION

Tests have demonstrated the practicality and utility of the claimed method and apparatus. When used for fluoroscopy images, it produces acceptable quality images with 30% of the X-ray intensity previously required. For lengthy fluoroscope procedures, the consequent reduction in exposure to X-ray photons for both the patient and radiologic personnel is of considerable clinical value.

Reduced X-ray flux produces darkened images with reduced contrast. This image degradation is reduced via look-up-table pixel transformation to brighten the raw images. The resultant pixel values[11] span the full range of numerical pixel values. The claimed method enhances the contrast, and removes random noise, reversing the image degradation due to reduced X-ray flux. This reduction is in addition to almost all other dose reduction techniques in use.

Specific effects on brightness and contrast: Perhaps the most notable effect of reduced X-ray flux on image quality is the corresponding reduction in brightness and contrast. The number of photons per pixel is reduced, reducing the exposure and the camera counts. The distribution of pixel values is shifted towards the low end which reduces the useful range of pixel values. This range is what gives rise to contrast, so that is also reduced. In order to recover the brightness and contrast, the input pixel values must be systematically modified to produce images which are readily interpretable.

In order to appropriately modify the input pixel values, their distribution must be measured and a translation function or table generated. Suppose the data has 8 bit resolution, i.e. there are 256 possible pixel values. But suppose that the reduced X-ray flux produces images with only 64 useful values: 0–63. When these are modified to span 0–255 using a function or lookup table, there will continue to be only 64 values spread across the wider range. This fundamental loss in brightness resolution produces additional image degradation.

But this loss in brightness resolution is recovered with the claimed method and apparatus. The function which is fit to the data is continuous. So when that function is realized at the image plane, the values which are computed may be anywhere on the continuum spanning the range of values used to generate the fit. For the example, there would have been 64 original values but they would span the full range of 0 to 255. The generated values, on the other hand, could take on any value in the 0–255 range, thus recovering the degraded brightness resolution.

The claimed method and apparatus are unique and powerful. The manner in which they are applied determines which advantages are realized. The uses include but are not limited to:
  reducing or eliminating interference,
  extracting pre-specified information.

The types of images for which the claimed method and apparatus provide significant advantages include but are not limited to:
  serial X-ray images acquired from a patient using fluoroscopy during heart catheterization, kidney stone removal, prostate surgery, diagnostic evaluation of the great vessels in the head, etc.,
  serial ultrasound images acquired from a patient to examine heart valve function, a developing fetus, etc.,
  low light visual images seen through an infrared or visible light camera for surveillance, or in a law enforcement, military situation, a driving situation.

DETAILED DESCRIPTION OF THE PREFERRED EMBODIMENTS

Figure 1:
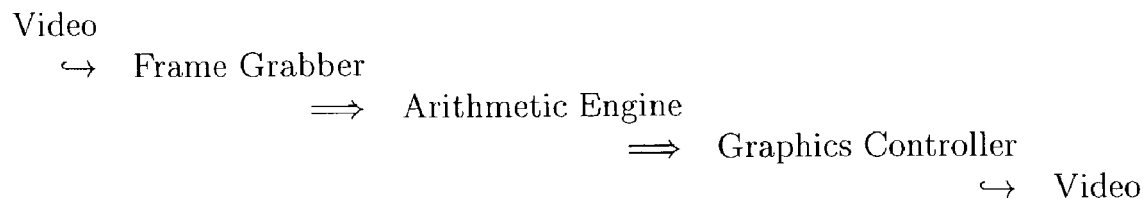
FIG. 1 is an example of a specific embodiment of the method. In this embodiment, the →'s represent analogue data movement. One or both of the the digital data flows represented by the →'s may be transmitted either across the standard bus of the host computer or, alternatively, directly via private bus from arithmetic processor to the next.
Figure 2:
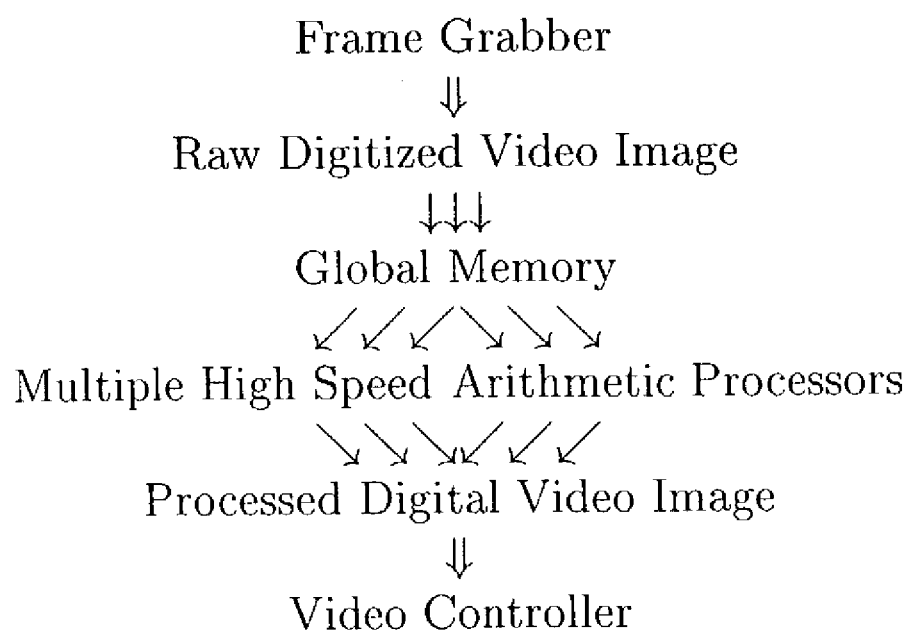
FIG. 2 shows more detail for the example portrayed in FIG. 1 with more detail of the processors in the central processing unit.

The apparatus is comprised of components which:
  capture multiple images of an object,
  manipulate the images arithmetically, and
  display the generated reduced noise images.

The apparatus is housed in a Dual G4 PowerMac Macintosh computer (Apple Computer Co.). This computer includes 2 PowerPC MPC74xx processors (Motorola), 256 MByte of RAM memory, a 30 GByte disk drive, a multiple slot PCI bus, a single slot AGP (double speed PCI bus) bus, a Radeon graphics controller (ATI Technologies Inc.), and an Apple 15" flat screen monitor. The graphics controller sits on the AGP bus. A frame grabber (Scion Corp. model CG7), which sits on the PCI bus, is capable of digitizing 30 analogue video images/sec and loading the resultant numbers into computer memory. The operating system is MacOS 9.1.

There is a central device which mediates communication to and from the PowerPC central processing units and all of the devices on the memory bus, the PCI bus, and the AGP bus. Each PowerPC includes 64 KBytes high speed on chip cache memory and 1 MByte of so-called L2 cache memory. Each PowerPC also includes an Altivec vector processor. This device performs operations on 16 bytes at a time. It is of particular importance for this apparatus that the Altivec processor is capable of 4 multiply and add operations/clock cycle. The multiply and add operation is particularly useful for matrix multiplication. At 500 MHz, that comes to a potential for 4 billion arithmetic operations per second for each of the PowerPC processors.

Below are copies of the primary method [claim 1] and apparatus [claim 17] claims. The corresponding elements of the embodiment described above are detailed in italics.

A method for reducing noise in electronic images comprising:

a. capturing the image represented as pixel values; [The Scion frame grabber converts analogue electronic images to 8-bit pixel values. For this the program uses calls to the Scion software development kit library which are executed by the primary PowerPC processor. The pixel values are moved into RAM using high speed block memory move commands which are executed by the primary PowerPC processor.]
b. selecting pixels from the image to form a pixel block; [The pixel values which constitute a pixel block are fetched into cache memory using Altivec commands. Both processors execute this task.]
c. fitting a function to the pixel block to obtain function parameters; [Referring to FIG. 6, a row of matrix A multiplies matrix B to obtain a row of C. This uses Altivec commands. Both processors execute this task.]
d. generating a pixel value calculated by expanding the function with the function parameters for the pixel block and coordinates of a pixel in or near the pixel block; and [Referring to FIG. 6, a row of matrix $C^T$ multiplies a column of matrix D to obtain one entry of E. This uses Altivec commands. Both processors execute this task.]
e. generating a reduced noise image by generating a plurality of pixel values. [c and d are executed repeatedly by both processors.]

An apparatus for reducing noise in electronic images comprising:
a. an input stage for converting analogue images to sets of whole number pixel values; [This is the Scion CG7 frame grabber.]
b. computer memory for storing: [This includes the cache memories, the 256 MBytes of RAM memory and the 30 GByte disk drive.]
  i. a computer software program; [The program is stored on the disk drive and loaded into RAM when invoked. The memory requirements include matrices B and D shown in FIG. 6. These matrices are computed once and then stored. The calculation of both matrices is detailed below in " . . . formulation for performing the fit using linear regression." Note that D is X in the equations and B is $(X^TX)^{-1}X^T$.]
  ii. pixel values; [RAM is dynamically allocated for storing pixel values. These are 8 bit non-negative whole numbers which range from 0 to 255. There are 640×480 pixel values for each image. Image storage is limited to the number needed to span the pixel block along the time axis. In the example functions cited in definition 23, 2 images at a time are stored in RAM.]
  iii. pixel coordinates; and [RAM is dynamically allocated for storing pixel coordinates.]
  iv. function parameters; [RAM is dynamically allocated for storing parameters.]
c. an output stage for displaying reduced noise images; and [This is the graphics controller and the monitor.]
d. a computer central processing unit coupled to the input stage, the output stage, and the computer memory, which executes a computer software program to perform the following tasks: [The central processing unit is composed of 2 Motorola PowerPC MPC74xx processors. The coupling between the various devices and the central processing unit is enabled by the buses and the Macintosh central communication mediation device. The program is written in the C programming language using the Metrowerks Code Warrior software development package for MacOS 9, the Scion Corp. software development kit, and the Macintosh multiprocessing software development kit. The computational routines utilize the Altivec capabilities extensively.]
  i. controls a conversion of electronic images to whole numbers pixel values, [The Scion frame grabber converts analogue electronic images to 8-bit pixel values. For this the program uses calls to the Scion software development kit library which are executed by the primary PowerPC processor.]
  ii. controls a transfer of pixel values into computer memory, [The pixel values are moved into RAM using high speed block memory move commands which are executed by the primary PowerPC processor.]
  iii. performs a selection of pixel values to form a pixel block; [The pixel values which constitute a pixel block are fetched into cache memory using Altivec commands. Both processors execute this task.]
  iv. fits a function to the pixel block to obtain function parameters; [Referring to FIG. 6, a row of matrix A multiplies matrix B to obtain a row of C. This uses Altivec commands. Both processors execute this task.]
  v. generates a pixel value calculated by expanding the function with the function parameters for the pixel block and coordinates of a pixel in or near the pixel block; [Referring to FIG. 6, a row of matrix $C^T$ multiplies a column of matrix D to obtain one entry of E. This uses Altivec commands. Both processors execute this task.]
  vi. generates a reduced noise image by generating a plurality of pixel values; and [Tasks iv and v are executed repeatedly by both processors.]
  vii. controls the transfer of generated pixel values to the the output stage; [The generated pixel values are moved from RAM into the frame buffer of the Radeon graphics controller using high speed block memory move commands which are executed by the secondary PowerPC processor.]

The embodiments detailed above are embodiments for claims 1 and 17. Two examples of functions are cited in the definition for function [23]. Both of these are effective for removing random noise [42]0 from images and instructions for fitting and expanding both are included in the computer program. This detail included with the embodiments detailed above for claims 1 and 17 are embodiments for claims 2 and 18.

In the example functions cited in the definition of function [23], there is a contribution to the terms of the function from mathematical expressions of T, time, viz. ($\Sigma_{k=0}^{1} C_k T^k$). When the index for this term, k, ranges over more than one value as in the example, then pixels from more than one image are used to form a pixel block, i.e. pixels are included from a predecessor image. This detail included with the embodiments detailed above for claims 1 and 17 are embodiments for claims 3 and 19.

The images may be acquired during a medical procedure [7]. This detail included with the embodiments detailed above for claims 1 and 17 are embodiments for claims 4 and 20.

The images may be medical images [2]. This detail included with the embodiments detailed above for claims 1 and 17 are embodiments for claims 5 and 21.

The images may be ultrasound [6] images. Many ultrasound machines include an NTSC and/or PAL analogue video output which can be input directly into the Scion frame grabber. This detail included with the embodiments detailed above for claims 1 and 17 are embodiments for claims 6 and 22.

The images may be fluoroscope [5] images. Many fluoroscopes include an NTSC and/or PAL analogue video output which can be input directly into the Scion frame grabber. This detail included with the embodiments detailed above for claims 1 and 17 are embodiments for claims 7 and 23.

The images may be CT [3] images. The input images could be the individual X-rays used to construct the CT images or the rendered CT images themselves. This detail included with the embodiments detailed above for claims 1 and 17 are embodiments for claims 8 and 24.

The images may be MR [4] images. This detail included with the embodiments detailed above for claims 1 and 17 are embodiments for claims 9 and 25.

Suppose the function fit [25] is by Fourier transform [29] rather than by linear regression as detailed above in the embodiments for claims 1 and 17. There is highly efficient special purpose arithmetic for performing the Fourier transform which makes this type of function fit desirable in some circumstances. The number of function parameters [24] obtained with the fast Fourier transform is the same as the number of pixel values in the pixel block. In order to remove high frequency noise in the image, we might zero the parameters which are multipliers for the high frequency terms in the transform. We then apply the inverse fast Fourier transform to the parameters (Fourier coefficients) to generate pixel values of the reduced noise image. The embodiments detailed above for claims 1 and 17 modified to use the Fourier transform with subsequent changing [26], e.g. zeroing, of the high frequency parameters are embodiments for claims 10 and 26.

The function fit [25] may be done using linear regression [28] as detailed in FIG. 6 and in the text below describing the linear regression equations and how they are handled. The embodiments detailed above for claims 1 and 17 wherein linear regression is used for the function fit are embodiments for claims 11 and 27.

The function fit [25] may be done using a transform [29] such as the Fourier transform. In that case, the calculations will utilize the fast Fourier transform and the generation of pixel values will utilize the fast inverse Fourier transform. The embodiments detailed above for claims 1 and 17 wherein the Fourier transform is used for the function fit are embodiments for claims 12 and 28.

The function fit [25] may be done using projection [31]. A transform is a projection operation but the arithmetic for a transform is used is often not matrix multiplication, i.e. fast Fourier transform. For projection, the arithmetic is usually matrix multiplication, as it is for linear regression. The embodiments detailed above for claims 1 and 17 wherein projection is used for the function fit are embodiments for claims 13 and 29.

The embodiments detailed above for claims 1 and 17 wherein there is a fixed lag between the time an image is captured and the time the reduced noise image is displayed are embodiments for claims 14 and 30. Ideally, the lag is less than one frame (1/30th sec for NTSC video) so that every image can be captured, the noise reduced, and the generated image displayed before the next image is ready for capture. This real time [46] capability depends upon speed. This is the reason that the computer central processing unit [33] is composed of two PowerPC processors rather than one and that this processor type was chosen for its inclusion of the high speed Altivec vector arithmetic processor. The Apple Computer multiprocessing software development kit provides important software capabilities for taking advantage of the full arithmetic processing speed of both processors as well as sharing the work of controlling the frame grabber which is handled by one processor and controlling the transfer of the reduced noise image to the display controller frame buffer which is handled by the other processor. Semaphores are used to maintain coherence between the computer program instruction sequences which are executed independently by the two processors. A cycle accurate timing tool called sim_g4 (Motorola) is useful for analyzing processor execution stalls so that the computer program instruction sequences can be optimized for speed.

The PowerMac computer includes an IEEE 1394 (Firewire) data interface designed to interface with, among other devices, a variety of digital cameras. The embodiments detailed above for claim 17 wherein digital images [17] are input into computer memory via the firewire interface instead of via the Scion frame grabber is an embodiment for claim 31.

Figure 6:
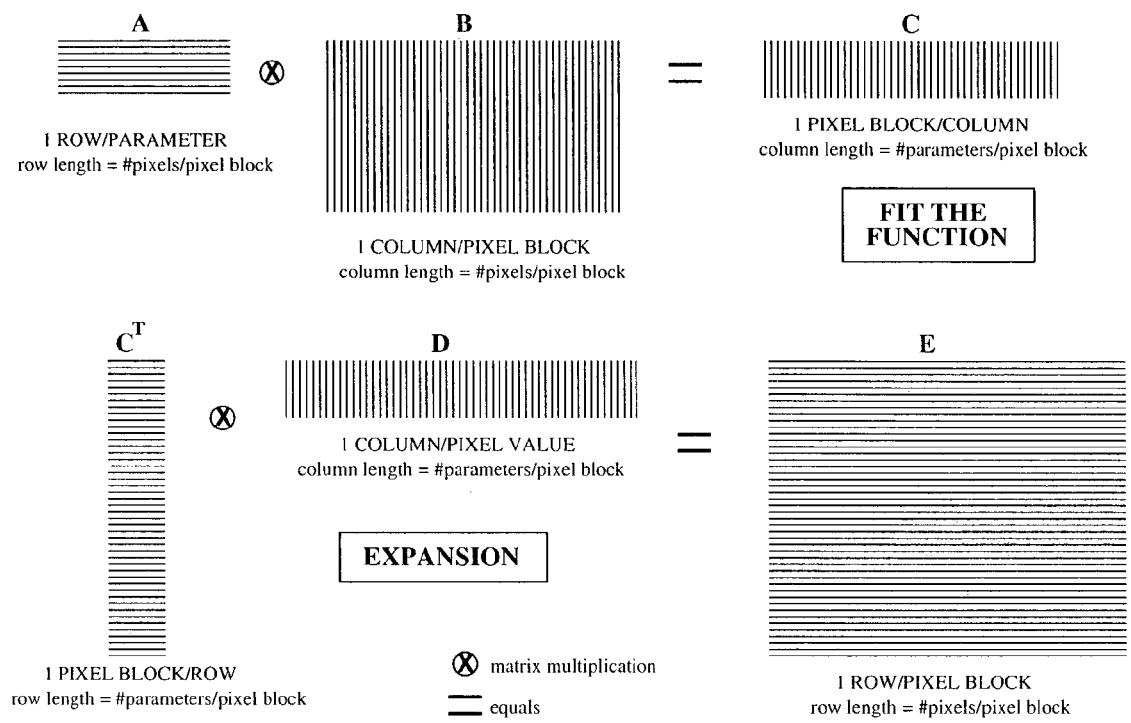
FIG. 6 is an example embodiment of the arithmetic for Function fit[25] and Expansion[27]. The calculation proceeds in two stages. The sequence in which the data in each matrix is organized is indicated by the parallel lines. Parameter estimation is applied to each data block. Each pixel block in this example is as shown in FIG. 5, a short sequence of subimages. The number of points per block≈1000. The number of parameters per block≈100. A ($\approx 100 \times 1000$) is a constant precomputed matrix. B ($\approx 1200 \times 1000$) is the data matrix. C ($\approx 100 \times 1200$) is the matrix of regression parameter estimates. D ($\approx 100 \times 256$) is a constant precomputed matrix. E ($\approx 1200 \times 256$) is the enhanced image. Each element in the product matrix C is generated by computing the dot product of the corresponding row of A with the corresponding column of B. The dot product of these 1000-element vectors requires 2000 floating operations. Production of the 120,000 elements of C therefore requires $1000 \times 1200 = 24 \times 10^7$ floating point operations. Production of the 307,200 elements of E requires $200 \times 307200 \approx 60 \times 10^6$ floating point operations. For this example, the total number of floating operations per frame is $30 \times 10^7$ and the total number of floating point operations required to handle 30 frames per sec $\approx 10^{10}$.

When the fit is done using linear regression via the matrix multiplications illustrated in FIG. 6, the arithmetic operations may be done using floating point arithmetic to retain as much accuracy as possible. The Altivec unit can perform these operations with great efficiency. The resultant floating point numerical parameters are the entries in matrix $C^T$ in the figure; floating point arithmetic operations are used for expansion matrix multiplication as well. This detail included with the embodiments detailed above for claims 1 and 17 are embodiments for claims 15 and 32.

The whole number [21] pixel values produced by the frame grabber on image capture may be cast to floating point numbers four at a time using the Altivec unit. The function is fit and the pixel values of the reduced noise image are generated. The pixel values of the reduced noise image are cast back to whole numbers four at a time by the Altivec unit for transmission to the display controller frame buffer. This detail included with the embodiments detailed above for claims 15 and 32 are embodiments for claims 16 and 33.

In general the display device could be a computer monitor or a heads up display. Or some other transformation engine could be interposed between the claimed apparatus and the visual display which is accessible to an observer. For example, if the apparatus is used to remove noise from images from a CT scanner, the reduced noise images might be input to a separate transforming arithmetic engine which performs the standard rendering to produce interpretable CT images. The layout of the basic three component device is portrayed in FIG. 1.

Here is a formulation for performing the fit using linear regression[28]: Consider the multivariate least squares equation $y=Xb+\epsilon$ where y is a vector of m pixel values in the pixel block, $\epsilon$ is a vector of m errors, b is a vector of r parameters, one for each term in the function, and X is a m x r matrix of values obtained by evaluating the r basis functions at the m pixel coordinates. Note that in the first example shown in the definition of function 1231, that example is a sum of terms like those shown at the bottom of the definition, i.e. the terms are expression like $A_3B_4C_1\alpha^3\beta^4\tau^1$. The terms in Xb in the equation above are terms like this. For the example term $A_3B_4C_1$ is one of the parameters and $\alpha^3\beta^4T^1$ is one of the basis functions.

The parameter vector, b, may be obtained according to the following equation [Green, 1978]: $b=(X^TX)^{-1} X^Ty$. Note that $A=(X^TX)^{-1} X_T$ is constant and therefore need only be computed once.

For each pixel block, the corresponding regression parameters are computed via the matrix by vector multiplication, Ay. Consider the following illustrative example. Suppose a pixel block is composed of a 100 pixels falling in a square array from each of 10 images in a sequence. Suppose further that the function terms[23], the basis functions to be fit, result from the cross product of 4 term functions along each of 3 axes, i.e. 64 in all, e.g. the example function from definitions 23 and 28. A has 64 rows and 1000 columns, and y is a 1000-element vector. The 64 parameters, b=Ay, are obtained by performing 64 dot products of two 1000-element vectors, y and the corresponding row of A.

The parameters are used to expand (realize) the function at pixel coordinates in or near the pixel block. It is those "realized" values which are the arithmetically generated pixel values which constitute the reduced noise image. Regression and realization (fit and expansion), are performed for each pixel block in the example image sequence (10 images in the example). FIG. 6 shows a schematic of the calculation for each pixel block. Note that each calculation is a matrix multiplication.

Figure 7:
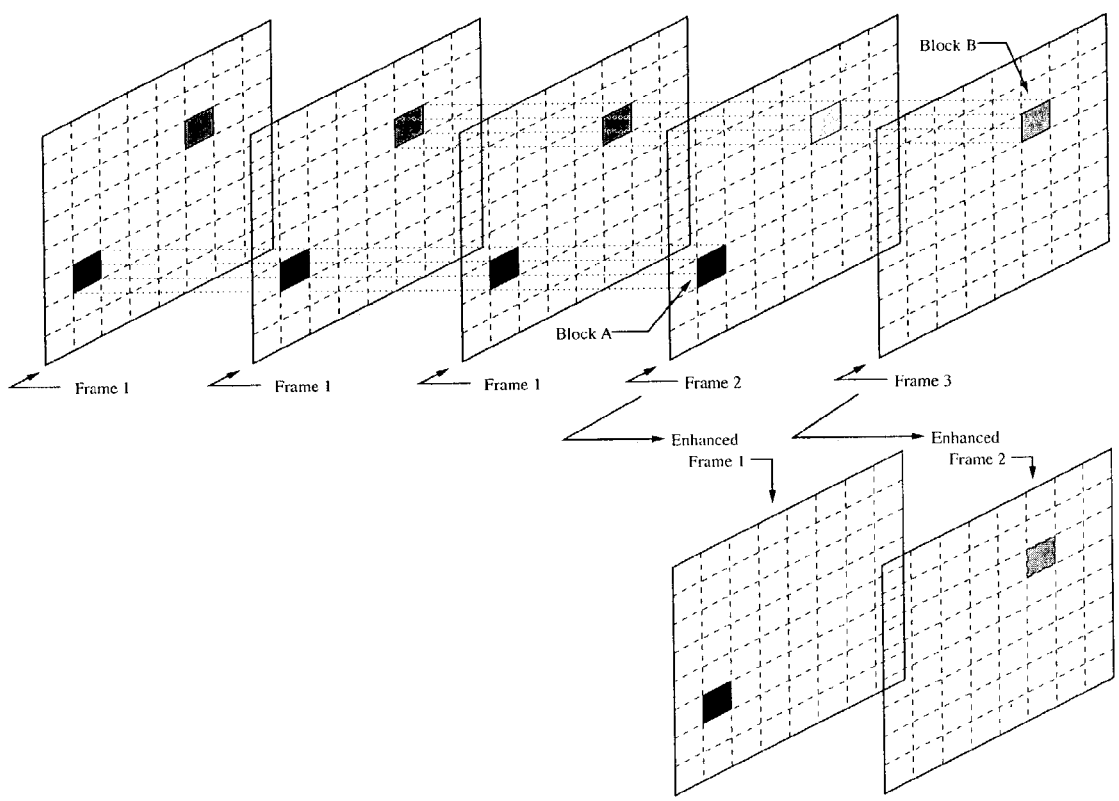
FIG. 7 is an illustration of the spatial and temporal relationships of the input images and the reduced noise output images during rapid startup. Note the similarity to FIG. 5. In this case, the first frame is replicated enough times so that as soon as the 2nd frame is acquired, the enhancement proceeds.
Figure 8:
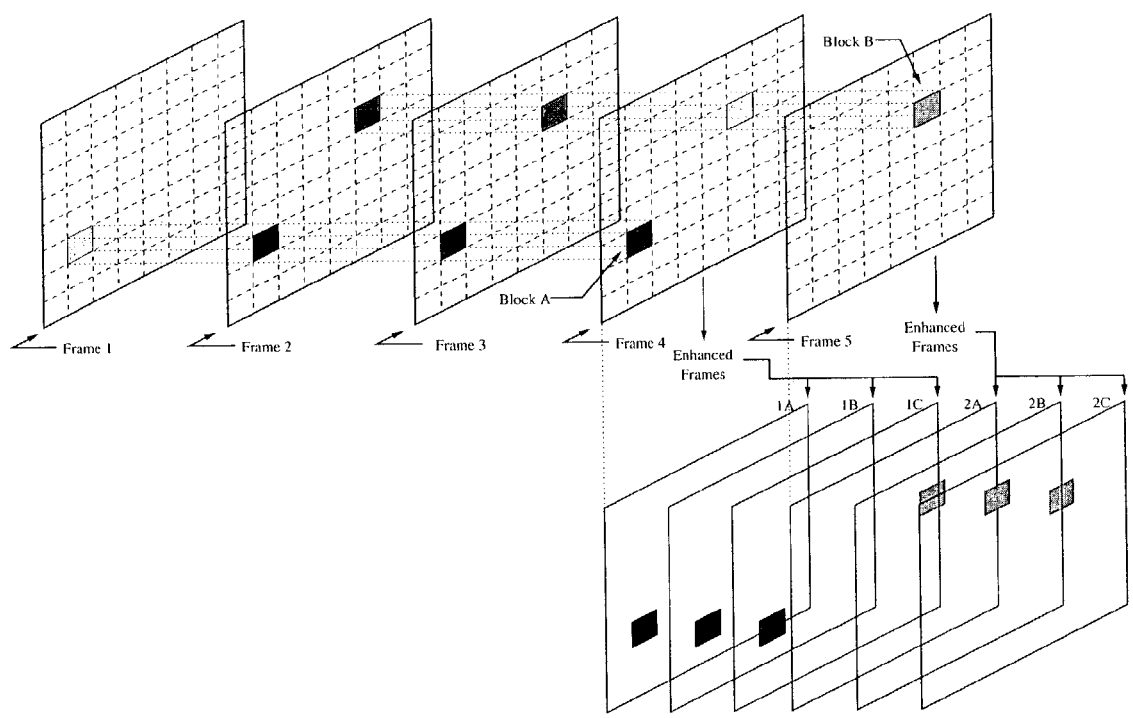
FIG. 8 is an illustration of the spatial and temporal relationships of the input images and the reduced noise output images during pulsed mode. The figure shows the method to display 30 frames/sec with the fluoroscope taking 10 frames per sec. For each fluoroscope frame, one regression is performed and then 3 enhanced frames are realized. This represents "predicting" a short time into the future. The calculation requirement is dramatically reduced compared with enhancement of 30 fluoroscope frames/sec since frame realization usually requires a fraction of the calculation required for parameter estimation.

In the example, as each new image is acquired, the 10 image long sequence which is used for the calculation advances by one to include the newest image and drops the oldest image. As can be seen from the description and from FIGS. 5,7, and 8, the method "slides" across the data. It uses large numbers of observations to fit a parametric multidimensional function at each time step for each pixel block. Because the pixel values are "reduced" to a relatively small number of parameters (from 1000 to 64 in the example) and because the selected function is ineffective at capture information in the image which is noise, the noise is attenuated.

At the core of the apparatus is a unique and powerful method. It can utilize multiple images, i.e. snapshots, of an object acquired in rapid succession. This rapidity is important because the effectiveness of the method increases if the object has changed only a little bit from one image to the next. This is because:
 1. the changes are continuous but they can only be approximated by this digital technique, and
 2. the functional form, although effective at capturing image information, does not in general perfectly model the movements of objects in space which are portrayed in the images.

Figure 4:
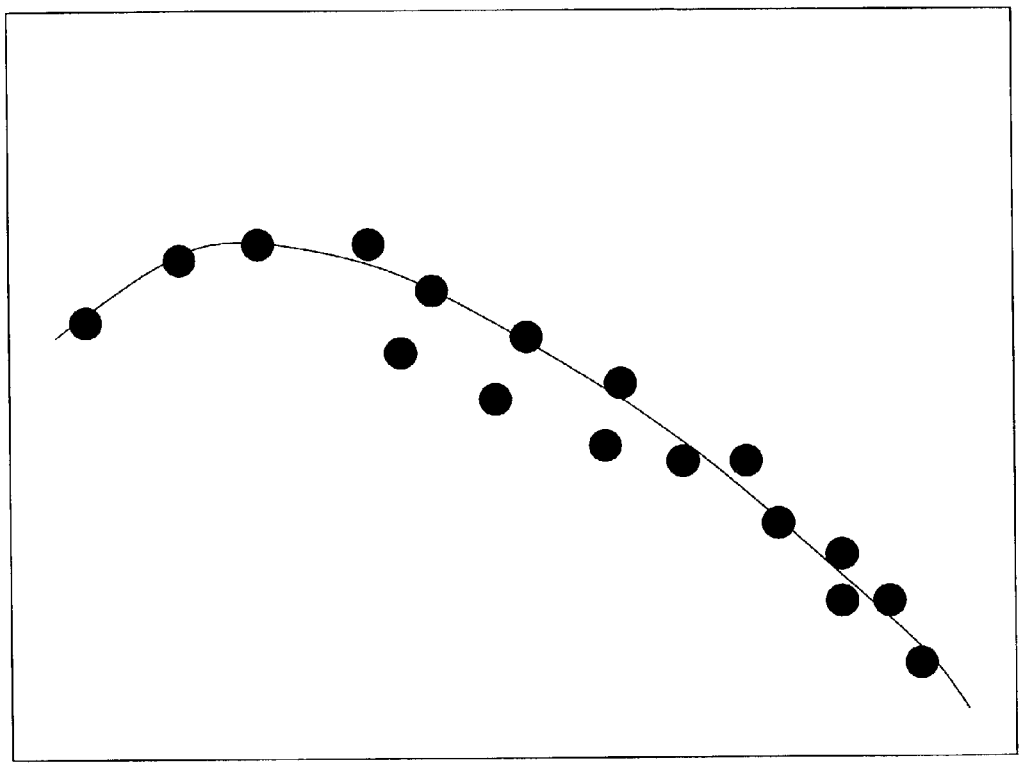
FIG. 4 is an example of a curve fit in one dimension. The dots represent the snapshot of a shape. This could be an electrical waveform, perhaps recorded from the brain of a surgical patient. The curve presents the adjusted form which has been fit to the snapshot. Note that what is portrayed is a waveform, i.e. a curvy line, i.e. a 1-dimensional object. If the shape was that of a sequence in time of these waveforms, then the curve fit would be to a 2-dimensional object. If the shape was that of an image, then the curve fit would also be to a 2-dimensional object. If the shape was a sequence in time of images in a fixed plane, then the curve fit would be to a 3-dimensional object. If the shape was a sequence in time of images in different planes, then the curve fit would be to a 4-dimensional object.

At any moment in time, the claimed apparatus may have access to several snapshots (images) of the object from the recent past. A functional "curve" or "form" is selected. This form is embodied by a mathematical expression which includes adjustable parameters. Those adjustments are set by the fit of the function so that the form fits the shape of the object as captured by the snapshots (see FIG. 4 for a 1-dimensional example). Each time a new snapshot is acquired, a new fit can be computed to fit the changing shape. Moment by moment, the apparatus can follow the shape of the object as portrayed by the recent images. When the form is fit to the images, the shape of the object is captured in the adjustable parameters of the function. For example, in FIG. 4 the snapshot is comprised of 17 data points. But the curve in the figure is a mathematical function with just 3 adjustable parameters. Those parameters are A, B, and C in the mathematical function:

$$y = Ax^2 + Bx + C$$

By capturing the shape in this way, some information is retained and some information is lost. Notice in the figure that what is retained is the information which is smoothly changing. And what is lost are the apparently random fluctuations about that smooth shape. Notice also that the snapshot captures the shape with points, i.e. discrete measurements, whereas the curve fit captures the shape as a continuum, i.e. as a smooth unbroken curve. Each of these characteristics of the curve fitting procedure is used to advantage by the apparatus, depending on the application. To reiterate, here are some key properties:
 1. The shape of the object is captured in the adjustable parameters of a mathematical formula.
 2. The number of adjustable parameters may be fewer than the number of data points in the corresponding snapshot. If the number of parameters is the same as the number of pixels in a pixel block, which may well be the case when a transform[29] is used to accomplish the fit, one or more of the parameters must be changed[26] to attenuate noise.
 3. The information which is retained is the smoothly changing shape.
 4. The information which is lost describes the apparently random fluctuations about that shape.
 5. The mathematical formula represents the shape as a continuum, i.e. as a smooth unbroken form.

In the examples, the shape which is captured in the adjustable parameters is a transformed version of the original snapshots. If this shape is displayed, one sees a smoother version of the original data. This is particularly useful if the data is contaminated by random noise. This is the basis for using the apparatus to remove random interference from images. For X-rays, this is particularly important. The brighter the X-ray, the less random noise will be present. But producing bright X-rays requires high X-ray doseage. If the doseage is reduced, the images are darkened and include more random noise. The apparatus may be used to resolve these conflicting requirements. The X-rays are acquired with low doseage; the apparatus is applied to reduce the random noise and to recover the degraded brightness, brightness resolution, and contrast of the images.

Two stages in the method serve the primary arithmetic tasks. One performs the fit, i.e. adjusts the parameters to fit the snapshots; the other performs the expansion. Linear regression is one method by which the fit is performed. Transform[29] and projection[31] are others. The fit captures the form of the object portrayed in the snapshots in the function parameters. The function parameters and the coordinates of the pixels in the generated pixel block are used in the expansion to generate a reduced noise image for display.

The claimed method can be used to attenuate the noise in images. In one test, each pixel block of 1000 pixel values was reduced to 100 parameters which were then used to generate (realize) reduced noise images for display. The claimed method can therefore be analyzed in the same way one would consider a lossy compression technique. The selection of the function to be fit to the data determines the type of information which is lost. The function can be chosen with specific properties to "identify" specific systematic image components.

When generating pixel values for the reduced noise image, property 5 becomes important. Suppose we are applying the apparatus to a sequence of noisy images at standard video rates, i.e. 30 images per second. We acquire the first image at time 0 sec, the second image at time $\frac{1}{30}$ sec, the third image at time $\frac{2}{30}$ sec, etc. Suppose we have set the apparatus to use 3 images at a time to estimate the parameters. At time $\frac{2}{30}$ sec er have the first 3 images. The fit results in parameters which "capture" the form of the 3 images, i.e. the parameters capture a smoothed version of the forms of all 3 images. Now when we want to display the reduced noise image, we must select time coordinates at which to expand the fit function. The parameters have captured a smoothed version of the object portrayed in the 3 snapshots for every instant between 0 and $\frac{2}{30}$ sec. The time coordinates for the generated pixels can be set for any instant between 0 and $\frac{2}{30}$ sec or even a little earlier of later[32]. In particular, if we chose to generate pixel values for a later time, e.g. $\frac{2\frac{1}{2}}{30}$ sec, we would be forecasting what the snapshot will be at that moment in the near future.

This continuum of information and the resultant capability of expanding the function at any instant is particularly important when applying the apparatus to so-called pulsed fluoroscopy. Fluoroscopy is used to obtain a live picture of what is occurring inside a patient's body by taking X-rays 30 times per second and displaying them on a TV screen. But in order to reduce the X-ray exposure, fluoroscopists often shoot at reduced rates, e.g. 15 or 7.5 per second. This is pulsed fluoroscopy. But the claimed apparatus can generate reduced noise images for several time points. In the 7.5 X-ray/sec case, for example, images 1, 2, and 3 are acquired at times 0, $\frac{1}{7.5}$, and $\frac{2}{7.5}$ sec. But the apparatus can generated reduced noise snapshots, i.e. smoothed X-ray images, at say $\frac{1.25}{7.5}$, $\frac{1.5}{7.5}$, $\frac{1.75}{7.5}$, and $\frac{2}{7.5}$ sec. In other words we can draw 30 images per second to the TV screen which show smoothly changing images at every image.

An image or image sequence may be divided into one or more pixel blocks. And the pixel blocks can have any shape. Each pixel block is a unit: the function is fit to produce function parameters for that pixel block separately from all others, and the function expansion to generate pixel values which will comprise the reduced noise image is carried out separately for that pixel block.

There are applications for the apparatus where the images are known to be contaminated by interference of a specific form. In the case of a darkened image, the noise is known to be random which suggests using a function which smooths the image to attenuate it. But often there is more systematic noise, e.g. from power lines or from nearby mechanical devices like motors. Recall that the fit is done with a selected function, a "curve" or "form". This form is embodied by a mathematical formula which includes adjustable parameters. Those adjustments are set during the fit so that the form fits the shape of the object as captured by the snapshots. If the form of the noise is known, that form can be included as one or more distinct terms in the selected function. Now when the parameters are obtained, some of them will correspond explicitly to the noise. If those parameters are trimmed when the expansion is done, the interference in the resultant generated pixel values will be attenuated.

Figure 3:
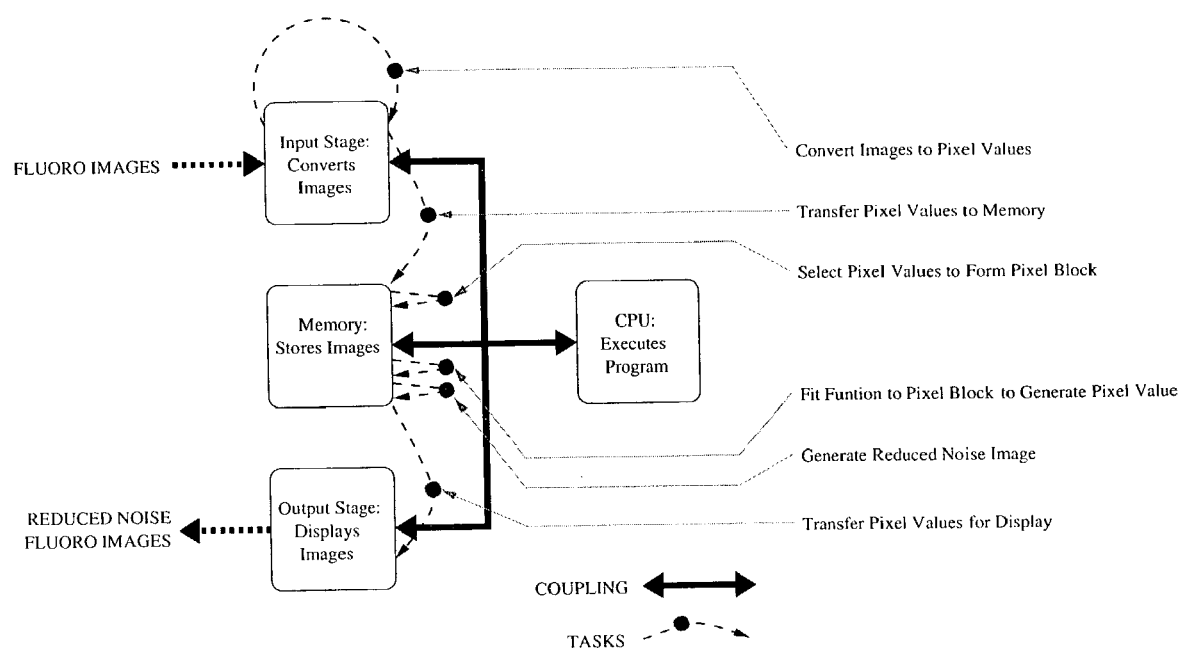
FIG. 3 is a block diagram of the apparatus of claim 17.
Figure 5:
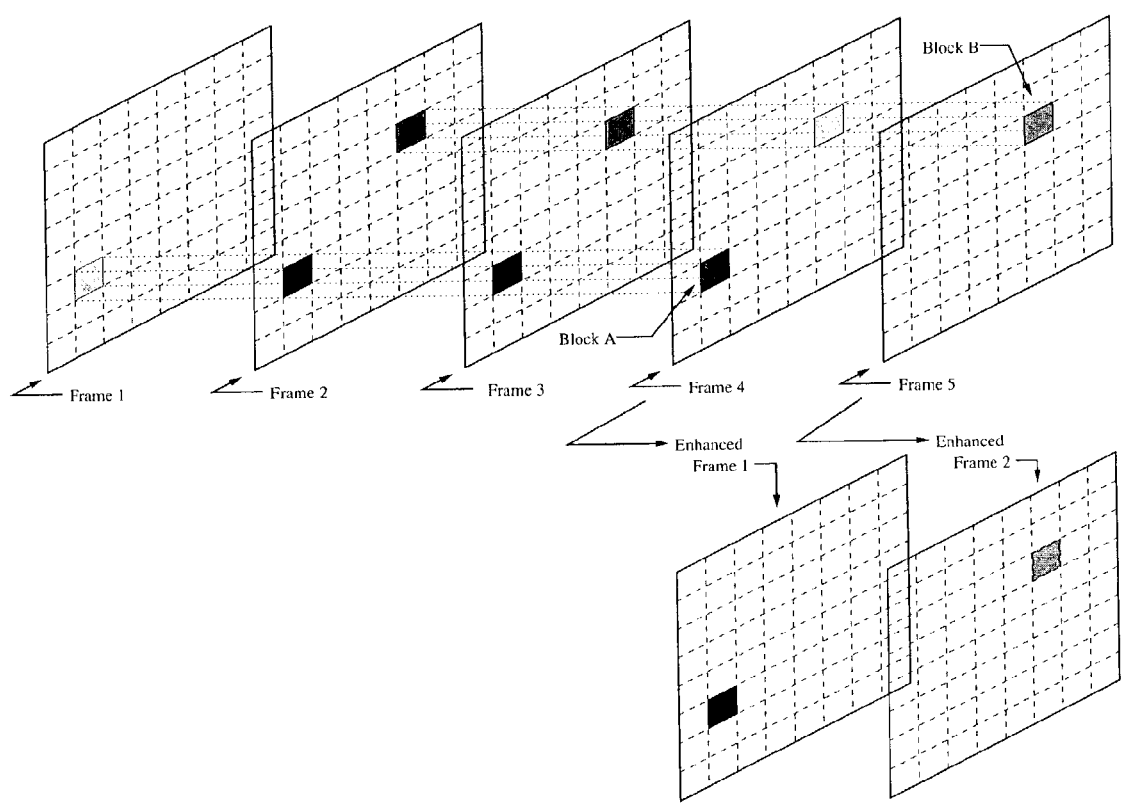
FIG. 5 is an illustration of the spatial and temporal relationships of the input images and the reduced noise output images. Above is a sequence of 5 input images. Below is a resultant sequence of enhanced images. The "block A" and "block B" details demonstrate division of the images into pixel blocks.

Data Manipulation: An example of the data flow and the calculation are illustrated in FIG. 3. FIG. 5 illustrates a sequence of images including the current image and those from the recent past (a total of 4 in the figure) which constitute the data to be manipulated in order to generate a reduced noise image. The figure also shows application of the method to pixel blocks. In this example each pixel block in the figure includes pixels from 4 images. These come from the same location in each of the 4 images. So in the example, the number of points used for each regression is 4×16×16=1024. The number of pixel blocks in the example is equal to the number of pixel blocks/image, i.e. 40×30=1200.

PARTS LIST analogue image input interface
digital image input interface
function
computer
computer central processing unit
computer memory
computer software program
computer display controller
computer display

DEFINITIONS

1. Electronic Image: This is an image whose information is carried electronically. The electronics may handle the image in analogue form for example as a continuously changing voltage or in digital form for example as a bit stream which encodes 8-bit numbers. An electronic image can be produced by a variety of devices, for example night vision binoculars, medical ultrasound machine, and medical fluoroscope.
2. Medical Image: This is an image acquired for diagnosis and/or treatment of disease.
3. CT—Computed Tomography. This is a type of medical image produced from a large number of X-rays taken from different angles.
4. MR—Magnetic Resonance: This is yet another type of medical image.
5. Fluoroscope: A fluoroscope is an X-ray machine which is capable of taking many X- rays each second and displaying them as they are taken. A fluoroscope includes an X-ray source, an X-ray sensitive camera, and at least one video display unit on which the X-rays are displayed. Most fluoroscopes include a video output connector at which a standard NTSC video signal is supplied. This signal is the type which home TV's in the United States are designed to display.
6. Ultrasound: This is a medical imaging modality which utilizes high frequency sound. Example regions for which this is routinely used are the heart and the developing fetus.
7. Medical Procedure: Fluoroscopes are used in a wide variety of medical procedures. These include but are not limited to lithotripsy, kidney stone removal, prostate surgery, cardiac catheterization for diagnosis, angioplasty, pacerriaker placement, implantable automatic cardiac defibrillator placement, stent placement, catheterization of the great vessels of the torso for diagnosis of vascular lesions, embolization of vascular lesions, stent placement, embolization of tumors, catheterization of the great vessels of the head for diagnosis of vascular lesions, embolization of vascular lesions, stent placement, embolization of tumors, and for reduction and fixation of bony fractures. In general a medical procedure is performed by a physician or qualified technician for diagnostic and/or treatment purposes.
8. Components of the Fluoroscope: The components of a fluoroscope include an X-ray source, an X-ray camera, power supplies, controls, one or more display devices, and often an image storage device. The X-ray source and camera are mounted to a so-called "C-Arm" which can be positioned as desired so as to obtain the desired images. The other components are typically mounted in one or more separate cabinets which, in the case of a portable machine, would be on wheels as would be the C-Arm. The method as recited in claims 1,2,3 may be implemented either as a component of a fluoroscope or as a separate system.
9. Image: An image is a picture. When the image is on film or photographic paper, the individual dots which make up the image are grains of emulsion (film) or pigment (paper) which are chemically altered by the action of the photons to which they are exposed. For fluoroscopy, the image is captured by an analogue X-ray camera or by a rectangular array of X-ray detectors. In either case, the individual dots which make up the pictures are electrical voltages which represent the gray scale of each dot.
10. Pixel: A pixel is an image element, a dot. An image is composed of a plurality of pixels. A pixel has two properties, a value and a location.
11. Pixel Value: For a fluoroscope image, there are two types of pixel values, analogue and digital. An analogue pixel value is a voltage which represents a shade of gray. A typical voltage range might be 0 volts to 5 volts with 0 volts representing black, 5 volts representing white, and the voltages ranging from 0 volts to 5 volts representing progressively light shades of gray. A digital pixel value is a number which represents the shade of gray. These numbers typically range from 0–255 ($2^8$–1) or 0–65535($2^{16}$–1) with the number at the low end of the range, 0, representing black, the number at the high end of the range representing white, and the numbers ranging from 1 to the high end of the range representing progressively lighter shades of gray.
12. Pixel Location: The plurality of pixels which comprise a fluoroscope image are arranged in a rectangular array. One of the standard sizes is that used in a standard NTSC video signal, i.e. 640 pixels wide by 480 pixels high. For that example, the location of each pixel might be represented by two numbers representing the pixel's horizontal and vertical position in the image. For exarriple the numbers for the pixel in the upper left corner might be 0,0; the upper right corner might be 0,639; the lower left corner might be 479,0; the lower right corner would be 479,639. The example is summarized graphically:

| 0,0 | 0,1 | ... | 0,638 | 0,639 |
|---|---|---|---|---|
| 1,0 | 1,1 | ... | 1,638 | 1,639 |
| 478,0 | 478,1 | ... | 478,638 | 478,639 |
| 479,0 | 479,1 | ... | 479,638 | 479,639 |

13. Pixel Coordinates: The coordinates of a pixel are the numbers which represent the location. For the example above in which the pixels are all from a single image, two numerical coordinates are required to specify the location of a pixel. A third number is required if the pixel location is in an image sequence. Whereas the first two coordinates represent the pixel's horizontal and vertical position in the image, the third coordinate represents the time at which the image in which the pixel falls was acquired.

14. Pixel Block: A pixel block is a set of pixels from one or more images which constitutes the unit of application for the function fit ad subsequent expansion. The coordinates of the pixels in the pixel block determine the locations for generated pixels in or near the pixel block.
15. Tile: A tile is a set of pixels from a single image.
16. Analogue Image: This is a image whose grayscale values are encoded as voltages.
17. Digital Image: This is a image whose grayscale values are encoded as numbers.
18. Predecessor Image: This is a image which was acquired before the most recent image.
19. Image Data Interface: This is a device which converts images to a form which may be manipulated by a arithmetic engine. A typical such interface might convert analogue images to digital ones. In that case the images would arrive at the interface as a rapidly changing voltage. This would be converted into a stream of numbers representing the gray scale values encoded in the voltages as described inthe definition of pixel value above. A common name for such an interface is "frame grabber".
20. Image Capture: This is the process of converting an image to a form usable by an arithmetic engine.
21. Whole Number: This is a positive or negative counting number. When expressed as a decimal number, only zeros appear after the decimal point. Examples of integers are –3, 5, 1000.
22. Floating Point Number: A floating point number may be expressed as the sum of a whole number arid a fraction. When expressed as a decimal number, any combination of digits may appear after the decimal. Examples of floating point nurribers are –3.553 and 10.895.
23. Function: A function is a systematic relationship between two sets of numbers which can be represented by an algebraic expression such as the following:

$$P_{\alpha,\beta,\tau} = \left(\sum_{i=0}^{5} A_i \alpha^i\right)\left(\sum_{j=0}^{5} B_j \beta^j\right)\left(\sum_{k=0}^{1} C_k \tau^k\right)$$

Note that the sets of numbers may be discretized or continuous. For the digital form of the method, the sets are discretized. In this example, which is one of the typical functions used in the method as recited in claim 1, $\alpha$ indexes the pixels along the hor- izontal axis of each image, $\beta$ indexes the pixels along the vertical axis of each image, $\tau$ indexes the images themselves, i.e. the time axis, and $P_{\alpha,\beta,\tau}$ is the numerical value of the pixel at coordinates $\alpha,\beta,\tau$. These numbers, the pixel values on the one hand and the pixel coordinates on the other, are the two sets of numbers whose relationship is defined by the function. Functions are mathematical representations of smooth geo- metric forms. The "smoothness" derives from the mathematical properties: continuous and continuously differentiable. In the example, the form is called a 3-dimensional hypersurface. A second example function whose 1-dimensional form is similar to the discrete cosine transform is:

$$P_{\alpha,\beta,\tau} = \left(\sum_{i=0}^{5} A_i \cos\left(\frac{2\pi i \alpha}{M}\right)\right)\left(\sum_{j=0}^{5} B_j \cos\left(\frac{2\pi j \beta}{N}\right)\right)\left(\sum_{k=0}^{1} C_k \tau^k\right)$$

In this example function, M and N are the number of pixels per tile in the horizontal arid vertical directions respectively. All other symbols are as defined for the first example function. In both of these examples, and in general, the quantities represented by the variables and parameters are usually not whole numbers so for increased accuracy they are usually represented as floating point numbers. This definition of function is meant to include an approximation of functions like the exarriples for which one or more of the parameters, variables, and/or terms of the function are constrained to be whole numbers. An example of a term from the first example is $A_3 B_4 C_1 \alpha^3 \beta^4 \tau$; note that there are 72 such terms in that example.

24. Function Parameters: Examples of these are the A's, B's, and C's from the example functions above. These symbols represent the numbers which are obtained each time the function is fit to a pixel block.
25. Fit the Function: Geometrically speaking, a fit is an arithmetic operation which adjusts the parameters of a function so that the data values to which the fit is performed fall as closely as possible to the hypersurface which is represented by the function. In the example of a function cited above, the data values are P's, the values of the pixels in a pixel block, and the $\alpha$'s, $\beta$'s, and $\tau$'s, the pixel coordinates. The A's, B's, and C's are the parameters which are adjusted to obtain the fit. A fit may be performed using linear regression. An example of how this is done is detailed in the specification. In the context of image compression, this process of obtaining the parameters is called "encoding." Much of the signal processing literature calls it "transform", although transforms typically retain all information, i.e. the fit is perfect. The Fourier transform for instance, provides a perfect fit. This definition of fit the function is meant to include fitting by [28] linear regression, [29] transform, or [31] projection.
26. Changed Parameter: An example of a change to a paranrieter is as follows. One of the terms of a function may effectively fit a particular expected type of noise in the image. In that case, once the fit is performed and prior to generating pixel values by expanding the function, that parameter might be changed by setting it to zero or by trimming it to near zero. This would attenuate the expected noise from the generated reduced noise image.
27. Expand the Function: This means carrying out the arithmetic operations defined in a function. Recall that the function defines the relationship between two sets of numbers. That means that if we have one of the sets of numbers, we can use the function to obtain the other set. In the example cited above, the fitting process provides the A's, B's, and C's. Once these are fixed, the function is fixed. Now if we know the $\alpha$'s, $\beta$'s, and $\tau$'s, the pixel coordinates, we can obtain the pixel values at those coordinates by performing the multiplications, additions, and other arithmetic defined by the function. If the function is estimated for example, by Fourier transform, then the expansion might be performed using the inverse Fourier transform. In the context of image compression, this process of expanding the function is called "decoding." This definition of expand the function is meant to include using an [30] inverse transform.

28. Linear Regression: This is a mathematical procedure which may be used to fit an equation whose right side is a function which is linear in the parameters and whose left side represents the observations. Using the notation from the definition of function [23], a typical form for a linear regression equation is:

$$f_{\alpha,\beta,\tau} = \sum_{}^{all\, m} (A_m X_m[\alpha, \beta, :96] + \epsilon_{\alpha,\beta,\tau})$$

In this form, the $f_{\alpha,\beta,\tau}$ are the observations (pixel values in this context) at the locations whose coordinates are $\alpha$, $\beta$, and $\tau$, the $A_m$ are parameters, the $X_m[\alpha,\beta,\tau]$ are terms as described in the definition for function which are functions of $\alpha$, $\beta$, and $\tau$, and the $\epsilon_{\alpha,\beta,\tau}$ are the fit errors. The parameters are adjusted during the regression process to minimize these errors by some criterion, typically so that the sum of the squared error values for all the pixels in the pixel block is minimized. Note that the $f_{\alpha,\beta,\tau}$ and $X_m[\alpha,\beta,\tau]$ become numbers once the data values are "plugged in." The first example function cited in the definition for function is linear in the parameters. This can be seen by multiplying it out. One then obtains $$P_{\alpha,\beta,\tau} = \sum_{}^{all\, i,j,k} A_i \alpha^i B_j \beta^j C_k \tau^k$$

where the $\rho_{\alpha,\beta,\tau}$ are the pixel values and the parameters become expressions like $A_i B_j C_k$. This can also be seen by noting that once the data values, i.e. the $\rho_{\alpha,\beta,\tau}$, $\alpha$'s, $\beta$'s, and $\tau$'s, are plugged in, each term in the sum is a fixed value multiplied by a single parameter which is equal to $A_i B_j C_k$. One method by which the linear regression calculation can be done using the least squared error criteria is detailed in the specification.

29. Transform: Examples of transforms are the Fourier transform and the wavelet trans- form. There is very efficient special purpose arithmetic for some transforms, e.g. the fast Fourier transform. Both these transforms and others have mathematical properties which are of significance. (a) The number of parameters is equal to the number of pixels in the pixel block, (b) the fit is perfect, (c) the terms of the function which is fit by a Fourier transform are orthonormal, and because the fit is perfect, (d) there is an inverse transform. Property (a) is of consequence because it makes the calculation to produce the fit less than ideally efficient: Property (b) forces the use of 26parameter changing in order to attenuate noise when generating the reduced noise image. Other- wise, because of the perfect fit, the "reduced noise" image would contain unattenuated noise. Property (c) guarantees that the transform can produce a perfect fit (orthogo- nality) and simplifies the calculations (normality). Property (d) provides an efficient special purpose arithmetic by which the reduced noise image may be generated when using the parameter values obtained from the transform to [27] expand the function.

30. Inverse Transform: For some transforms, there are inverse transforms. These enable complete recovery of the original data which was transformed. When very efficient special purpose arithmetic exists for a transform, e.g. fast Fourier transform, there is usually a very efficient special purpose arithmetic for the inverse transform.

31. Projection: A projection is equivalent to a [29] transform except that the calculation is typically performed using matrix multiplication rather than specialized arithmetic like the fast Fourier transform. When conceived in terms of projection, the fit is to a function whose terms correspond to the axes of a space where the set of pixel values of a pixel block is a single point, i.e. if there are n pixels in the pixel block therm there are n axes in the space. The projection of this point on each of the axes is the length of the "shadow" cast on each axis where the light source for each projection is on a line at right angles to the corresponding axis and passing through the point. The resultant value of each projection operation is a parameter corresponding to that term. The advantage is that even though there are n axes (terms) and therefore n projections, not all of them need be calculated. Instead we would typically calculate only the ones which we expect to be efficient at capturing the visual information in the image and inefficient at capturing the noise. This amounts to truncating the matrix multiplication to include only the rows of the "projection" matrix corresponding to the terms we want 32. In or Near: This means either within or outside but in close proximity to a boundary of the space whose boundaries are defined by the coordinates of the pixels in the block. For example, if the time coordinates of the images from which the tiles are taken are 0,1,2, then the time coordinate of a pixel "in or near" the pixel block will be defined as between −1 and 3. If the time coordinate is between 0 and 2, then the pixel is "in" the the pixel block. If the time coordinate is between −1 and 0 or between 2 and 3, then the pixel is "near" the pixel block.

33. Central Processing Unit: This is the central component of a corriputer. It controls the other components of the computer including the memory and any input or output devices and it is responsible for all arithmetic operations. Some computers include more than one central processing unit. Multiple central processing unit's can be coupled together so that work can be shared an thereby be completed more rapidly. This definition of central processing unit is meant to include this common variant.

34. Commercially Available Computer: This is an oft-the-shelf computer or a computer which is assembled from off-the-shelf components, for example a PC or an Apple Macintosh.

35. Computer Monitor: This is a TV-like video device on which output from a computer is displayed.

36. Computer Display Adaptor: This is the component of a computer which can control a computer monitor and display on it images and information which is represented in the computer only as numbers.

37. Noise: This is extraneous information in an image which does not pertain to the objects portrayed in the image. In fluoroscopy for instance, there is random information, i.e.

38. Signal to Noise Ratio: This is a measure of the fidelity of an image, i.e. how closely does the image conform to object of which it is an image. The noise is a measure of how much the plurality of an images pixel values are perturbed from the values which they would have if the image conformed perfectly to the object. The noise in a fluoroscope image increases if the number of photons used to obtain the image is reduced. When the noise increases, the signal to noise ratio goes down. When the noise increases, the signal to noise ratio goes up.

39. Reduced Noise Image: This is the modified version of the medical image to which the methods claimed has been applied. Some of the noise present in the original image is absent from this image.

40. Identified Noise: When a term of a function is chosen for its effectiveness if fitting a particular type of noise, the parameters from that term once the fit is performed measure the quantity of the identified noise.

41. Systematic Noise: This is extraneous information which has an identifiable form, i.e. it is not random. For example, 60 cycle/sec waveforms often can be seen in other electrical signals. This noise is highly systematic and can be 40identified using two parameters.

42. Random Noise: This is extraneous information which has no identifiable form. It can have properties though which allow isolating it. The quantum noise which predomi- nates X-ray images acquired with too few X-ray photons is random but with much of its power in the high frequency components of the image.

43. Floating Point Function Parameters: These are function parameters which are set to floating point numbers by the fitting process.

44. Floating Point Arithmetic Operation: These are arithmetic operations such as addition and multiplication which using floating point numbers.

45. Computer Memory: This is a computer resource which has the capacity to store infor- mation.

46. Real Time: This means that the task is maintained in step, albeit with a fixed delay. For example, if an apparatus produces reduced noise images in step with the images being acquired during live fluoroscopy, it is real time.

47. Coupled: This means connected in a manner which enables transmission of information and/or control. The transmission can be in one direction or in many depending on the number and nature of the devices which are coupled and the nature of the connection.

48. Input Stage: This is a device which provides medical images in a form which can then be manipulated by the method or apparatus claimed.

49. Output Stage: This is a device which enables display of reduced noise images generated by the method or apparatus claimed.

50. Computer Software Program: A computer software program is a sequence of instruc- tions in a form which can be loaded into a computer and which, when executed by the computer, performs a particular task. When the program is stored in computer mem- ory, it includes among other things, the locations in computer memory of the variables and constants required for its execution such as those which are needed to specify the form of the alto be used.

What is claimed:

1. A method for reducing [37]noise in [1] electronic images comprising:
    a, [20] capturing the image represented as [10,11]pixel values;
    b, selecting pixels from the image to form a [14] pixel blocke;
    c, [25] fitting a [23] function to the pixel block to obtain [24] function parameters;
    d, generating a pixel value calculated by [27] expanding the function with the function parameters for the pixel block and [13] coordinates of a pixel [32] in or near the pixel block; and
    e, generating a [39] reduced noise image by generating a plurality of pixel values.

2. The method as recited in claim 1 including providing a function whose application according to this method reduces noise.

3. The method as recited in claim 1 including selecting pixels from a [18] predecessor image and including the pixels from the predecessor image in the pixel block.

4. The method as recited in claim 1 wherein the images are acquired during a [7] medical procedure.

5. The method as recited in claim 1 wherein the images are [2] medical images.

6. The method as recited in claim 1 wherein the images are [6] ultrasound images.

7. The method as recited in claim 1 wherein the images are [5] fluoroscope images.

8. The method as recited in claim 1 wherein the images are [3] CT images.

9. The method as recited in claim 1 wherein the images are [4] MR images.

10. The method as recited in claim 1 including [26] changing a function parameter to reduce noise.

11. The method as recited in claim 1 wherein the function is fit by [28] linear regression.

12. The method as recited in claim 1 wherein the function is fit by [29] transform.

13. The method as recited in claim 1 wherein the function is fit by [31] projection.

14. The method as recited in claim 1 wherein the reduced noise image is generated in [46] real time.

15. The method as recited in claim 1 wherein:
    a, the function is fit using [44] floating point arithmetic operations;
    b, the function parameters are [43] floating point function parameters; and
    c, the pixel value which is generated by expanding the function using floating point function parameters and floating point arithmetic operations is a floating point pixel value.

16. The method as recited in claim 15 including:
    a, converting [21] whole number pixel values in the pixel block to floating point numbers; and
    b, converting floating point pixel values of the reduced noise image to whole number pixel values.

17. An apparatus for reducing noise in electronic images comprising:
    a, an [48] input stage for converting [16] analogue images to sets of whole number pixel values;
    b, [45] computer memory for storing:
        I, a [50] computer software program;
        Ii, pixel values;
        Iii, pixel coordinates; and
        Iv, function parameters;
    C, an [49] output stage for displaying reduced noise images; and
    D, a computer [33] central processing unit [47] coupled to the input stage, the output stage, and the computer memory, which executes a computer software program to perform the following tasks:
        i. controls a conversion of electronic images to whole numbers pixel values;
        ii. controls a transfer of pixel values into computer memory;

iii. performs a selection of pixel values to form a pixel block;
iv. fits a function to the pixel block to obtain function parameters;
v. generates a pixel value calculated by expanding the function with the function parameters for the pixel block and coordinates of a pixel in or near the pixel block;
vi. generates a reduced noise image by generating a plurality of pixel values; and
vii. controls the transfer of generated pixel values to the the output stage.

18. The apparatus as recited in claim 17 including providing a function whose application by this apparatus reduces noise.

19. The apparatus as recited in claim 17 wherein selected pixels from a predecessor image are included in the pixel block by the central processing unit when executing the computer program.

20. The apparatus as recited in claim 17 wherein the electronic images are acquired during a medical procedure.

21. The apparatus as recited in claim 17 wherein the electronic images are medical images are acquired during a medical procedure.

22. The apparatus as recited in claim 17 wherein the electronic images are ultrasound images.

23. The apparatus as recited in claim 17 wherein the electronic images are fluoroscope images.

24. The apparatus as recited in claim 17 wherein the electronic images are CT images.

25. The apparatus as recited in claim 17 wherein the electronic images are MR, images.

26. The apparatus as recited in claim 17 wherein the tasks executed by the computer central processing unit include changing a function parameter.

27. The apparatus as recited in claim 17 wherein the function is fit by linear regression.

28. The apparatus as recited in claim 17 wherein the function is fit by transform.

29. The apparatus as recited in claim 17 wherein the function is fit by projection.

30. The apparatus as recited in claim 17 wherein the reduced noise image is generated in real time.

31. The apparatus as recited in claim 17 wherein the input stage is a digital interface for inputing digital images as whole number pixel values into the computer memory.

32. The apparatus as recited in claim 17 wherein:
a, the function is fit by the central processing unit using [44] floating point arithmetic operations;
b, the function parameters are [43] floating point function parameters; and
c, the pixel value which is generated by the central processing unit by expanding the function using floating point function parameters and floating point arithmetic operations is a floating point pixel value.

33. The apparatus as recited in claim 32 wherein the tasks executed by the central processing unit include:
a, converting whole number pixel values in the pixel block to floating point numbers; and
b, converting floating point pixel values of the reduced noise image to whole number pixel values.

* * * * *